United States Patent [19]

Hadjis et al.

[11] Patent Number: 5,176,825
[45] Date of Patent: Jan. 5, 1993

[54] SYSTEM FOR TREATING FOOD WASTE BY CENTRIFUGAL SPIN DRUM AND BAG FILTER

[75] Inventors: David Hadjis; Michael Giordano, both of Ontario, Canada

[73] Assignee: Dyno Drain Corporation, Ontario, Canada

[21] Appl. No.: 558,610

[22] Filed: Jul. 27, 1990

[30] Foreign Application Priority Data

Aug. 4, 1989 [CA] Canada .................................. 607,635

[51] Int. Cl.$^5$ ............................................. B01D 33/56
[52] U.S. Cl. ........................................ 210/170; 4/652; 4/653; 99/646 LS; 210/259; 210/360.1; 210/411; 210/484; 210/507
[58] Field of Search ............... 210/170, 256, 259, 260, 210/295, 299, 315, 324, 317, 329, 335, 337, 338, 342, 403, 500.1, 360 A, 360.1, 507, 411, 484; 4/DIG. 4, 629, 652, 653; 494/36; 99/646 LS

[56] References Cited

U.S. PATENT DOCUMENTS

| | | | |
|---|---|---|---|
| 623,955 | 4/1899 | Gage et al. | 210/500.1 |
| 1,471,614 | 10/1923 | Duke | 210/360 A |
| 2,212,831 | 1/1917 | Spelman | 210/360.1 |
| 2,400,879 | 5/1946 | Hilliker | 210/299 |
| 3,874,006 | 4/1975 | Ritter | 4/629 |
| 4,689,840 | 9/1987 | Mück et al. | 4/629 |
| 4,767,395 | 8/1988 | Mellert | 494/36 |

Primary Examiner—Robert A. Dawson
Assistant Examiner—Joseph Drodge
Attorney, Agent, or Firm—Zarley, McKee, Thomte, Voorhees & Sease

[57] ABSTRACT

This invention provides means whereby the liquid component can be separated from the solids in food waste and garbage. The invention provides a spinning perforated drum with an internal filter bag through which liquid and fine solids pass by centrifugal force. The separated liquid is filtered through a finer filter to make the water acceptable for municipal sewer disposal.

4 Claims, 3 Drawing Sheets

SYSTEM FOR TREATING FOOD WASTE BY CENTRIFUGAL SPIN DRUM AND BAG FILTER

This invention relates to improvements in waste disposal. In particular, it relates to improved equipment for the separation of liquid and solid constituents of food waste or garbage.

The disposal of food waste and garbage has become a major expense and a serious environmental concern. As a result, increasing regulation has made greater demands on the techniques for handling and disposing of such waste.

Food waste typically includes a wide variety of materials such as stalks, stems, leaves, peels, rinds and the like which are discarded in food preparation as well as solid food which is uneaten and left over portions of coffee, soup, gravy, broth and the like. As a result, a garbage bag or garbage bin from a typical kitchen (especially an institutional kitchen where quantities are large and separation is not undertaken) will include a variable mixture of solids and liquids. This creates two major problems; (a) the removal, haulage and disposal of the liquid portion is difficult and costly because of it's weight and (b) liquids drained from such wastes are often unacceptable for municipal sewer systems because they contain fats and other material which contaminate and clog the system.

The invention disclosed in this application seeks to address these problems and provide the economic and environmental advantages of separating a large portion of the disposable liquids from the solid waste or garbage. It is the purpose of this invention to separate liquids so as to reduce the weight, and therefore the cost of hauling and disposal, of food garbage and at the same time to treat the removed liquid so that it is acceptable in municipal sewer systems and does not have to be hauled away separately or otherwise treated.

These objects and other advantages are achieved by the present invention which provides a liquid waste separator adapted to treat food waste or garbage and comprises a housing consisting of a frame and enclosure, a perforated spin drum mounted to spin about an axis, means to spin the spin drum, a collector drum substantially surrounding the spin drum and adapted to collect liquids passing radially through said spin drum, a filter removably insertable to rest within said spin drum and adapted to contain solid particles of waste and adapted to permit passage of liquid radially therethrough, and means to convey said liquid to sewer drains.

A suitable filter for the spin drum is a burlap bag of sufficient density to entrap most solids and solid particles while permitting substantial flow of liquids therethrough. The efficiency of the device is improved if it includes a fine micro filter adapted to filter out smaller particles of fat or other solids which pass through the burlap bag but which are not acceptable for disposal in municipal sewer systems. An additional feature of the preferred embodiment of this invention includes means by which water can be backflushed through the filter in the reverse direction to clean out fine particles and solids which are entrapped by the micro filter and return the mixture of water and fine solids to the filter bag.

Thus, by means of the present invention the mess and weight of the liquid component of food waste and garbage is eliminated and need not be hauled away for disposal. At the same time, the separated liquid is treated so that it is acceptable for disposal through municipal sewer systems.

The foregoing invention can be better understood by a detailed description of one embodiment thereof with reference to the accompanying drawings in which FIG. 1 is a vertical cross section of a food waste separator designed in accordance with the present invention.

Figure 1:
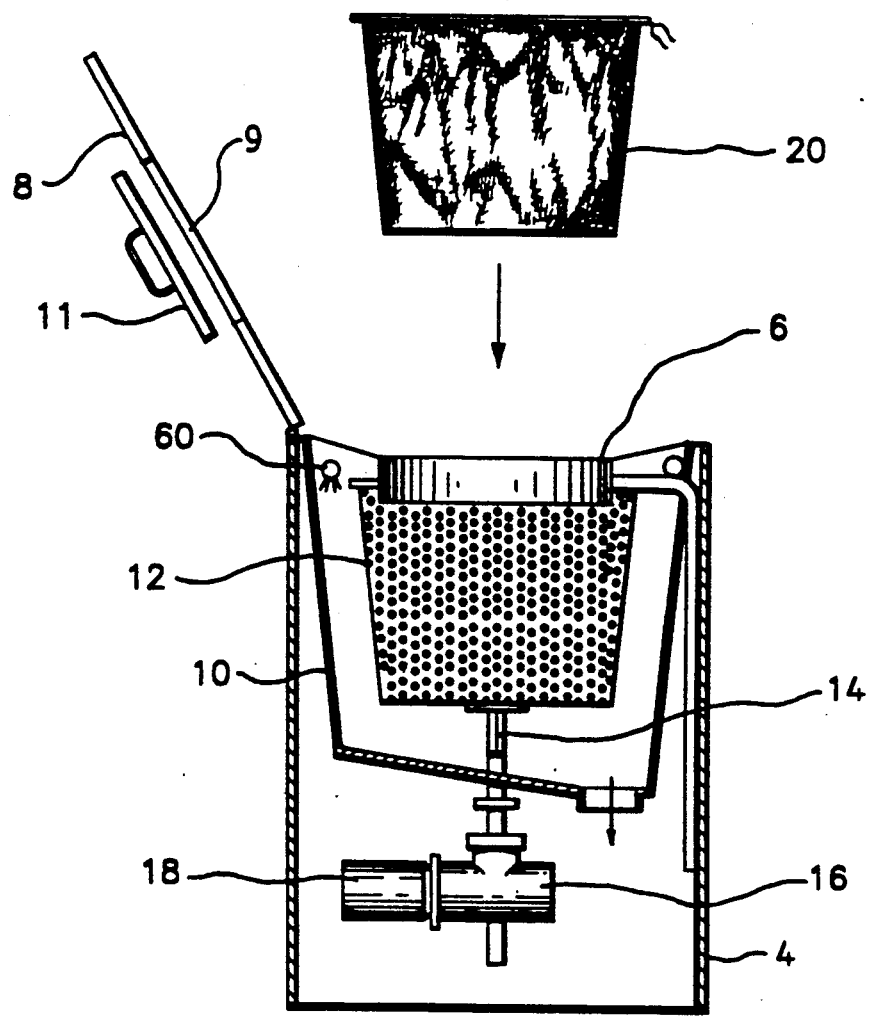
Figure 2:
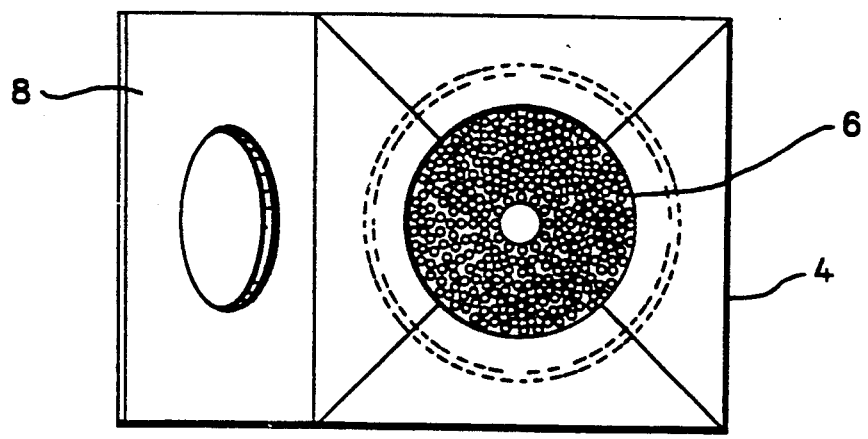
FIG. 2 is a plan view of the separator shown in FIG. 1.

The embodiment of the invention illustrated in the drawings comprises a steel frame 2 enclosed by a stainless steel enclosure 4, having a circular opening 6 of about fourteen inches in diameter in the top. Ideally, this opening is provided with a hinged cover 8 with a central opening 9 and a lid 11.

Mounted within the enclosure is a stationary collector drum 10.

Within the collector drum is a circular (or otherwise symmetrical) perforated spin drum 12 which is mounted to spin on a vertical axle 14 which is concentric with the axis of the spin drum. The axle 14 is mounted beneath to support the spin drum and extends downward to a gear reducer 16 which is driven by a ¼ horse power, 115 volt, single phase motor designed to operate at approximately 1,700 to 1,800 rpm. The gear reducer 16 has a reduction ratio of approximately 20:1 so that the speed of the drum in operation is approximately 100 rpm. The perforations in the spin drum are large enough to permit easy passage of liquid waste but small enough to contain solid particles and small enough to provide a rigid support for a filter.

Illustrated above the opening of the enclosure in FIG. 1 is a flexible, disposable, burlap filter bag 20 which can be inserted into the spin drum and will form a liner against substantially the entire interior surface of the spin drum. The burlap filter bag has a vertical surrounding wall and bottom with an open top into which material may be dumped. Ideally, the burlap should be so woven as to provide a filtered passage for liquid material but a barrier to particles and larger pieces of solid waste, grease and the like. The bag may also be provided with a drawstring at the top so that the top may be gathered and tied to enclose it after use. It may also be provided with a hoop to hold the top opening in position in the drum.

Figure 3:
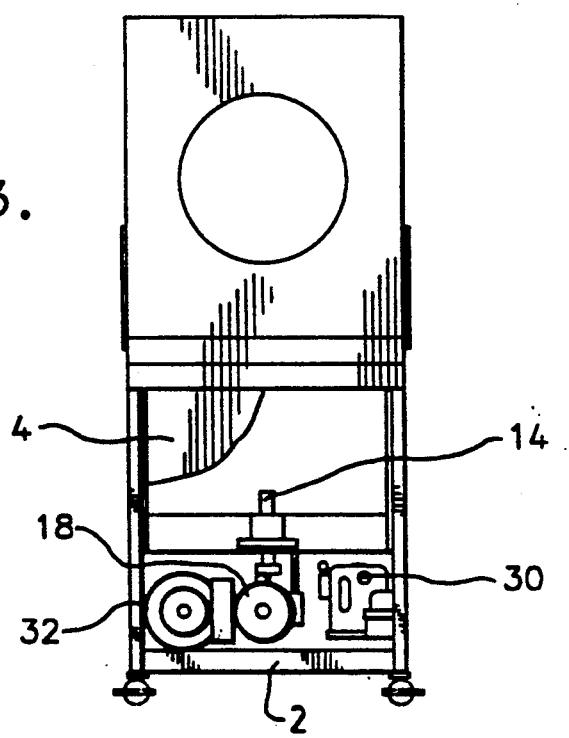
FIG. 3 is an elevation view of the fluid flow equipment of the device shown in FIG. 1.

FIG. 3 illustrates additional machinery of the preferred embodiment including the frame 2, the enclosure 4 and the motor 18 which drives the spin drum through the reduction gear 16.

Reference numeral 30 refers to a ¼ horsepower, 15 volt, single phase, 1,725 rpm pump and 32 represents a backwash filter, which will be described in greater detail later.

Figure 4:
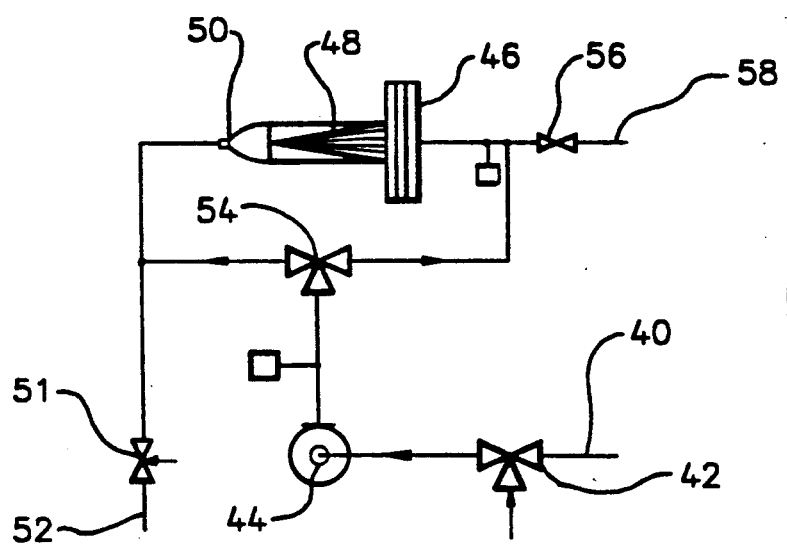
FIG. 4 is a schematic flow diagram of the backwash and micro filter system in the device of FIG. 1.

FIG. 4 illustrates schematically the plumbing which provides for the handling of the water which is removed from the waste by means of the spin drum and filter bag This liquid is caught by the collector drum and passes through the outlet in the lower end thereof at 40 (also shown in FIG. 1) and is conducted by a ¾ inch line to an electrically operated three way ball valve 42, (as illustrated in FIG. 4), from which it passes into a circulating pump 44 and is conducted to the inlet end 46 of the micro filter 48 which serves to remove additional fine particles of grease, fat and other solids and semi solids.

The filtered water then passes out through the outlet of the filter at 50 and is conducted through a ¾ inch line to a drain 52 of the municipal sewer system.

Because the micro filter 48 will soon become clogged with solids it is necessary to clean it periodically. However, removal and replacement is time consuming and expensive. Therefore, the present invention provides a means by which it may be cleaned periodically and automatically. By activating the three way valve 42, drain 40 is closed and fresh water may be admitted which is conducted to the circulating pump 44 and by means of an additional three way valve 54 may be directed to the "outlet end" 50 of the filter and passed in the reverse direction through the micro filter 48 to wash out the collected solids and convey them through the end 46 to the electrically operated two way valve 56, which in this mode is activated to conduct the stream to the line 58 (also seen in FIG. 1) where the water with a substantial quantity of solids and semi solids is deposited inside the filter bag of the spin drum, to be refiltered in another cycle.

Figure 5:
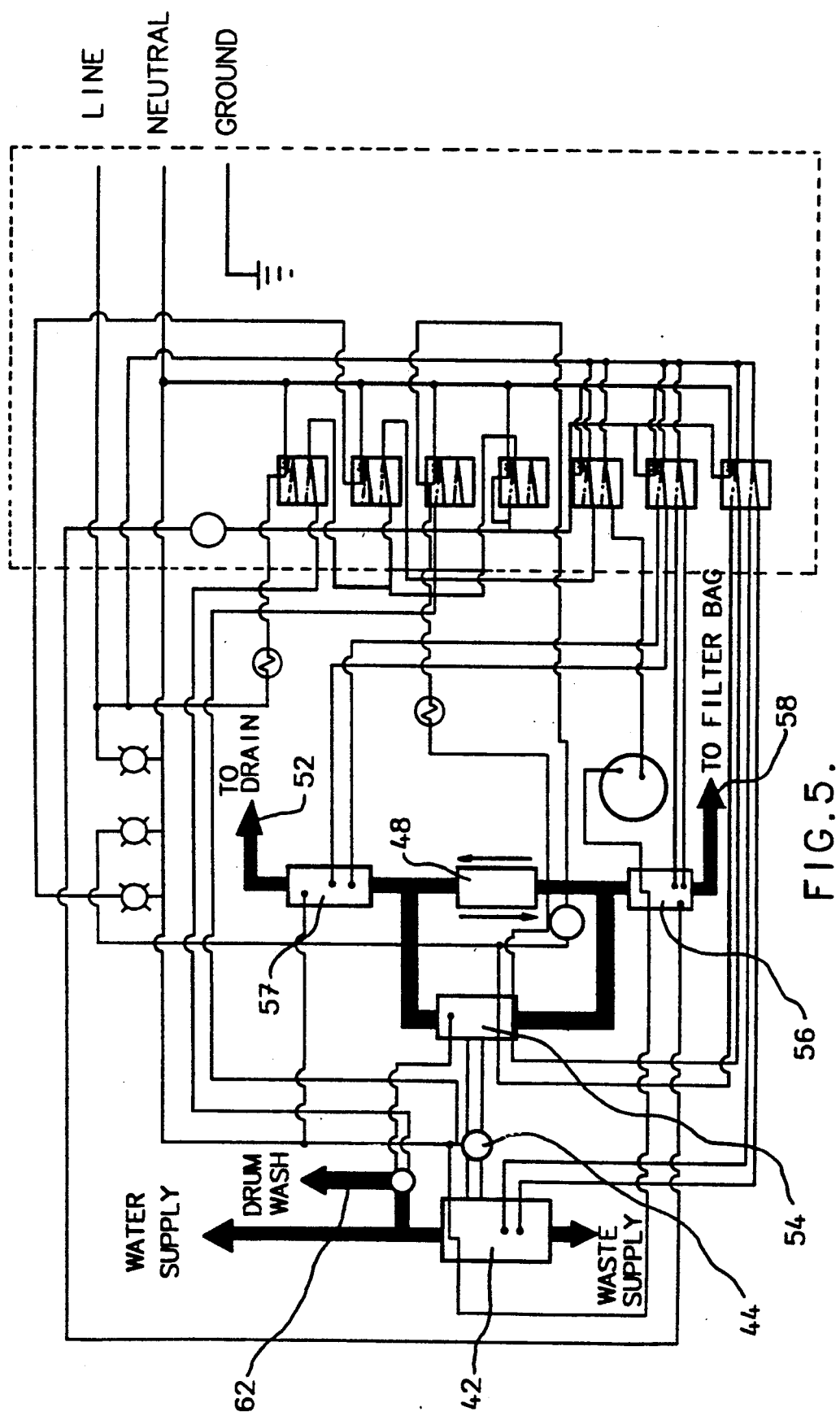
FIG. 5 is a schematic illustration of the electrical controls for the equipment shown in FIG. 4.

FIG. 5 illustrates schematically the electrical system which activates the spin drum circulating pump 44 and the valves 42, 54, 56 and 57.

In operation, the illustrated embodiment is used by positioning a disposable burlap filter bag 20 inside the spin drum 12 (while it is stationary). The unseparated food waste or garbage is then deposited inside the filter bag. When the machine is turned on, the spin drum will rotate at approximately 100 rpm causing the liquid content of the garbage to migrate radially under centrifugal force which causes it to pass through the burlap filter bag and through the perforations in the spin drum to be collected in the collector drum 10. Additional mixed garbage may be added to the filter bag and processed by spinning until the filter bag is full or unable to handle any more. When the filter bag is "full" the bag with the semi dry and substantially lighter garbage may be removed and tied at the top and deposited in a bin or garbage truck for haulage to a waste disposal site or for use as fodder. Thus, the burlap bag serves not only as a filter to separate liquid and solid waste but also as a degradable garbage bag which permits the handling of the separated solid garbage. A new filter bag can be inserted to handle the next batch of untreated garbage.

As mentioned initially, the separation of the liquid from the solid is only part of the problem. It is also necessary to insure that the liquid removed is suitable and acceptable for disposal in the municipal sewage system so that it does not have to be hauled away as well. To provide for this, the illustrated embodiment provides the machinery illustrated schematically in FIG. 4.

As can be seen in FIG. 1, the collector drum receives the filtered liquid which then passes out through the drain 40 (see also FIG. 4) at the lower end and is conducted to the three way valve 42 and thence through the circulating pump 44, the three way valve 54 and through the micro filter 48 where unacceptable solid particles and particles of grease or oil are removed by the filter which is finer than the burlap liner of the spin drum. The filtered water may then be transmitted to the drain of the municipal sewer system.

As previously explained, the micro filter 48 requires frequent cleaning because it becomes clogged by the removed particles of fat and solid matter. Therefore, by programming the electrical controls illustrated in FIG. 5, the separator is capable of automatically cleaning the micro filter by the admission of fresh water from the municipal supply through the three way valve 42 and through the micro filter 48 in the reverse direction to carry the "back flush" water with the particles of fat and solids removed from the filter entrained therein, through the two way valve 56 to return it to the burlap filter in the spin drum.

Although the fine solid and fatty particles which are backflushed out of the micro filter have previously passed through the burlap it will be appreciated that on returning them to the spin drum many of these particles will be caught in the mass of solid garbage and other material and the burlap filter on a subsequent cycle. In other words, the material flushed out of the micro filter will not all return to plug it up again.

Experience has shown that it is preferable, at least in certain circumstances, to provide additional wash water to the collector drum 10 by means of a water line which runs around the top periphery of the collector drum and spays water on the inner walls so as to wash off any fat or grease or other particles which impinge upon the collector drum. The drum wash line 60 (shown in FIG. 1) is supplied with fresh water by means of the line 62 in FIG. 5.

In a typical cycle a filter bag 20 is inserted in the spin drum 12 and is then loaded with garbage which comprises a mixture of solids and liquids. When the machine is started, the drum 12 will spin causing liquid to pass through the filter and the drum to the collector drum 10. At the same time, fresh water is sprayed into the collector drum through the line 60. As the water level rises to about two or three inches a detection switch will turn on the circulating pump 44 which will begin to feed the separated liquid (and wash water) through the filter 48. A second switch is provided in the collector drum so that if the water level reaches a level of approximately five inches the spray will shut off and the circulating pump will gradually lower the water level. If the water level drops below two or three inches the pump is automatically shut off.

Experiments have been conducted with various densities of burlap in the filter 20. The tests using burlap of densities of 5½ ounce, 7 ounce and 10 ounce (an industry standard which refers to the weight of a sample of material measuring approximately 40 inches by 36 inches) revealed that a 7 ounce material appeared to provide the best combination of water passage and retention of solids and fine particles. Obviously different densities of burlap might suit different types of waste.

Figure 6:
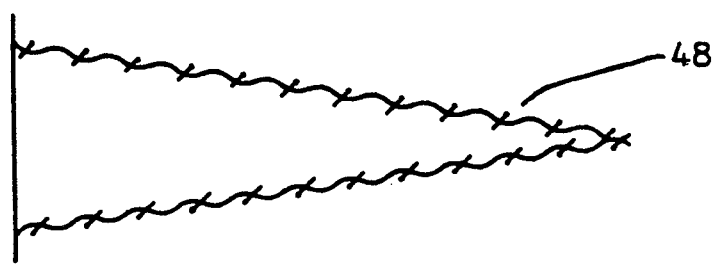
FIG. 6 illustrates the micro filter of the illustrated embodiment.

Similarly, the micro filter employed will depend on the nature of the material treated and the requirements of the municipal sewer system which handles the liquid waste. However, experience has shown that a micro filter composed of an inner layer of stainless steel with 20 micron mesh sandwiched between layers of stainless steel having ⅛ inch perforated holes will do a satisfactory job. Such a micro filter is illustrated in FIG. 6.

Thus, the present invention typified by the embodiment described above provides a means by which a liquid portion of food waste and garbage may be removed so as to eliminate the mess, weight and cost of transporting and disposing of a substantial portion of institutional garbage. At the same time, the removed liquids are rendered acceptable for the municipal sewer system by means of a secondary filtering system which is finer than the burlap filter bag. Furthermore, the present invention provides a means by which the separated solid garbage may be easily handled by using the burlap filter as a garbage bag and the secondary micro filter may be constantly and automatically cleaned so that it is usable over and over again to treat water from the collector drum.

It will, of course, be realized that numerous modifications and variations of the illustrated embodiment may be employed without departing from the inventive concept herein.

The embodiments of the invention in which an exclusive property or privilege is claimed are defined as follows:

1. A liquid waste separator adapted to treat food waste and garbage comprising;

a perforated spin drum mounted to spin about an axis of rotation;

means to rotate the spin drum;

a collector drum surrounding the spin drum constructed and arranged to collect liquid waste expelled centrifugally from the spin drum;

a filter bag removably insertable in said spin drum adapted to permit the passage therethrough of liquid waste and adapted to hold solid particles of waste;

means to convey said liquid waste from said collector drum to a sewer drain.

2. A device as claimed in claim 1 in which said filter bag is comprised of burlap.

3. A device as claimed in claims 1 or 2 including a fine microfilter adapted to filter out fine particles from said expelled liquid waste and means to convey said liquid waste through said micro filter.

4. A device as claimed in claims 3 including means to back-flush water through said microfilter to remove fine particles collected in said microfilter and means to convey said water and fine particles to return them to the filter bag in said spin drum.

* * * * *